(12) United States Patent
Kim et al.

(10) Patent No.: US 8,900,520 B2
(45) Date of Patent: Dec. 2, 2014

(54) APPARATUS FOR TREATING EXHAUST PARTICULATE MATTER

(75) Inventors: Yong Jin Kim, Daejeon (KR); Bang Woo Han, Daejeon (KR); Soon Cheon Hwang, Daejeon (KR)

(73) Assignee: Korea Institute of Machinery and Materials, Daejeon (KR)

( * ) Notice: Subject to any disclaimer, the term of this patent is extended or adjusted under 35 U.S.C. 154(b) by 1526 days.

(21) Appl. No.: 12/084,228

(22) PCT Filed: Nov. 10, 2006

(86) PCT No.: PCT/KR2006/004710
§ 371 (c)(1),
(2), (4) Date: Jan. 6, 2009

(87) PCT Pub. No.: WO2007/055535
PCT Pub. Date: May 18, 2007

(65) Prior Publication Data
US 2009/0129993 A1    May 21, 2009

(30) Foreign Application Priority Data

Nov. 11, 2005  (KR) .................. 10-2005-0108042

(51) Int. Cl.
| | | |
|---|---|---|
| B01J 19/08 | (2006.01) | |
| F01N 3/01 | (2006.01) | |
| B01D 53/94 | (2006.01) | |
| B01D 46/00 | (2006.01) | |
| F01N 3/08 | (2006.01) | |

(52) U.S. Cl.
CPC .............. *F01N 3/01* (2013.01); *F01N 2240/04* (2013.01); *B01D 53/944* (2013.01); *B01D 46/0078* (2013.01); *F01N 3/0892* (2013.01); *Y02T 10/20* (2013.01); *F01N 2240/28* (2013.01); *B01D 2258/012* (2013.01); *Y10S 422/907* (2013.01); *Y10S 422/906* (2013.01)
USPC .......................... 422/186; 422/907; 422/906

(58) Field of Classification Search
CPC ....... B01J 19/088; F01N 3/0892; Y02T 10/20
USPC .......... 422/186, 906, 907; 588/311, 301, 306; 204/157.15
See application file for complete search history.

(56) References Cited

U.S. PATENT DOCUMENTS

2001/0020582 A1* 9/2001 Barankova et al. ........... 204/164
2007/0098614 A1* 5/2007 Iida et al. .................... 423/245.3

FOREIGN PATENT DOCUMENTS

| JP | 2001-314730 | 11/2001 |
|---|---|---|
| JP | 2003-236335 | 8/2003 |
| JP | 2004-343899 | 12/2004 |
| JP | 2005-016411 | 1/2005 |

OTHER PUBLICATIONS

International Search Report and Written Opinion for PCT/KR2006/004710 dated Feb. 21, 2007.
International Preliminary Report on Patentability for PCT/KR2006/004710 dated Aug. 3, 2007.

* cited by examiner

*Primary Examiner* — Natalia Levkovich
(74) *Attorney, Agent, or Firm* — Rabin & Berdo, P.C.

(57) ABSTRACT

An apparatus treats harmful particulate matter generated through combustion. The apparatus includes a concentrator concentrating the harmful particulate matter and a plasma generator burning the concentrated harmful particulate matter. Thereby, the harmful particulate matter can be efficiently removed.

2 Claims, 2 Drawing Sheets

APPARATUS FOR TREATING EXHAUST PARTICULATE MATTER

TECHNICAL FIELD

The present invention relates to an apparatus for treating exhaust particulate matter, and more particularly to an apparatus for burning harmful particulate matter using plasma.

BACKGROUND ART conventional exhaust emission reduction apparatus is designed to trap and burn or to control exhaust emission in an exhaust pipe using a filter, for instance, of ceramic or catalyst, but it has difficulty in obtaining a high removal performance of the harmful particulate matter due to an excessive pressure loss in compliance with its use, re-emission of the harmful particulate matter from the filter, and the like.

FIG. 1 illustrates a conventional exhaust emission reduction apparatus. This exhaust emission reduction apparatus includes a porous filter 114 installed in the tailpipe 112 of a vehicle. The exhaust gas emitted from an engine passes through the porous filter 114, and harmful substances contained in the exhaust gas are adsorbed to the porous filter 114. Thereby, the exhaust gas is cleaned. With the use of this filter 114, the clogging of the filter 114 causes the increase of a pressure loss.

In order to remove the harmful particulate matter trapped by the filter 114, the harmful particulate matter should be burned or dusted off. When the harmful particulate matter is burned, the sequential combustion process should be employed. Furthermore, during heating, the volume of the filter 114 increases and it leads to the break in the filter 114.

Further, in the combustion process, the filter 114 encounters various problems in that its lifespan maybe reduced by the shock of heat, and that its function is deteriorated by incomplete combustion.

This conventional exhaust emission reduction apparatus has a problem in that fine particles are emitted again from the filter 114 while the filler 114 is regenerated by a method such as combustion, and another problem in that other harmful gases or particulate matters are generated by secondary reaction.

Furthermore, an exhaust emission reduction apparatus based on an electrostatic precipitator mechanism has a problem in that, because the electric resistivity of the harmful particulate matter is low, the harmful particulate matter is attached to a dust collecting plate and then detached again from the plate. A device for continuously removing the trapped harmful particulate matter is additionally required.

Further, when the harmful particulate matter is trapped by an electrostatic precipitator, a phenomenon where the harmful particulate matter is repetitively trapped at a tip of the trapped harmful particulate matter, thereby growing in a shape similar to a chain, so-called a pearl chain phenomenon, takes place. As a result, an electric field between a ground electrode and a discharge electrode is disturbed. Thereby, the dust collection efficiency is reduced.

DISCLOSURE OF INVENTION

Technical Problem

Therefore, the present invention has been made in view of the above-mentioned problems, and it is an objective of the present invention to provide an apparatus for treating exhaust particulate matter, in which the harmful particulate matter is burned by a plasma generator, thereby eliminating a need to exchange or regenerate a filter.

According to an aspect of the present invention, there is provided an apparatus for treating exhaust particulate matter. The apparatus includes a concentrator having a pipe through which the harmful particulate matter passes and a core installed in the pipe, and concentrating the harmful particulate matter, and a plasma generator installed near a rear end of the core, and generating plasma to burn the concentrated particulate matter.

Here, the core of the concentrator may be installed on a central axis of the pipe of the concentrator. Further, the core of the concentrator may taper off toward a downstream side of the pipe of the concentrator.

Meanwhile, the concentrator may include a ground electrode attracting the harmful particulate matter which is electrically charged. Preferably, the concentrator may include a discharge electrode charging the harmful particulate matter and a ground electrode attracting the charged harmful particulate matter. To this end, the core of the concentrator may act as the ground electrode, and the discharge electrode may be formed on an inner surface of the pipe of the concentrator.

Further, the discharge electrode may be installed on an inner surface of a tailpipe of a vehicle.

At this time, the ground electrode may be installed on a central axis of a tailpipe of a vehicle. Further, the ground electrode may taper off toward a downstream side of a tailpipe of a vehicle.

The plasma generator may include a gliding discharge plasma generator generating plasma by means of gliding discharge.

The apparatus may be installed at a front or rear end of a diesel particulate filter (DPF).

Advantageous Effects

As can be seen from the foregoing, according to the present invention, the apparatus for treating exhaust particulate matter is a practical exhaust emission reduction apparatus overcoming drawbacks of the existing dust collection mechanism and filter mechanism, and can obtain weight reduction and high efficiency.

The apparatus for treating exhaust particulate matter concentrates harmful particulate matter contained in exhaust gases with electrostatic force, and immediately burns it into harmless gaseous matter, and thus does not require separate storage tank or combustion, or exchange or regeneration of a filter, so that it can obtain a simple structure and remove inconvenience that the filter should be regenerated.

The apparatus for treating exhaust particulate matter concentrates a condensable or fine harmful particulate matter and then burns and convert it into gaseous matter through high-temperature plasma, so that the formation of particles caused by secondary reaction of an existing filter or catalytic surface is completely intercepted.

When the apparatus for treating exhaust particulate matter is mounted at the front of DPF, it removes most of harmful particulate matters, so that a lifespan of DPF can be considerably prolonged. When the apparatus for treating exhaust particulate matter is mounted at the rear of DPF, it can concentrate and condense nano-scale ultrafine particles and burn up them.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

BRIEF DESCRIPTION OF THE DRAWINGS

The foregoing and other objects, features and advantages of the present invention will become more apparent from the following detailed description when taken in conjunction with the accompanying drawings in which.

EXPLANATION ON ESSENTIAL ELEMENTS OF DRAWINGS

Figure 1:
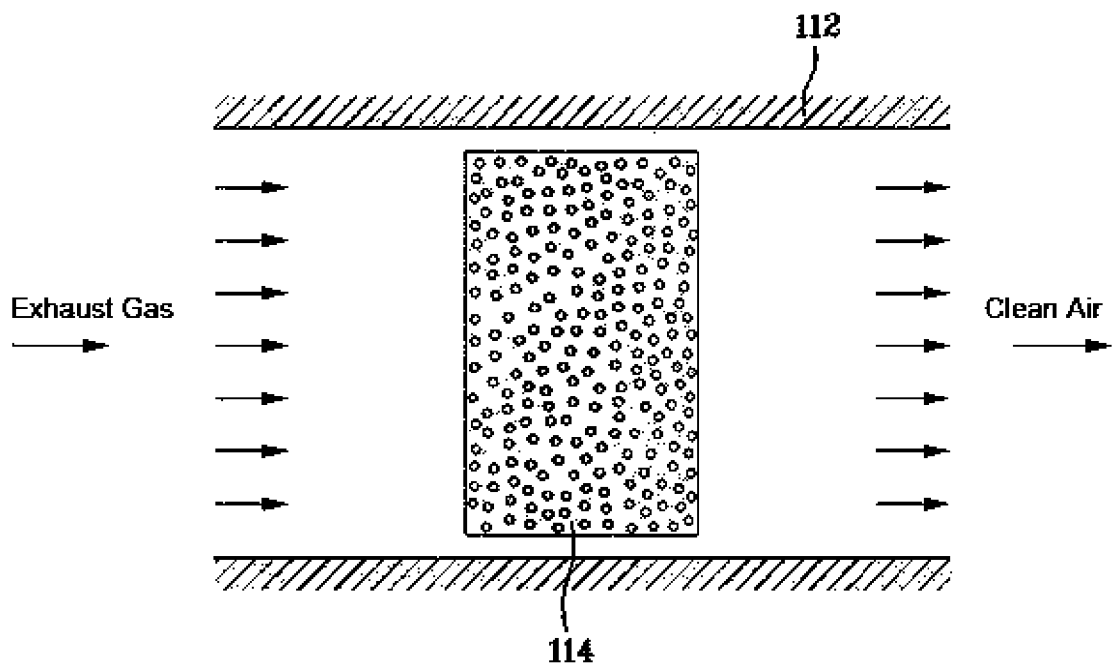
FIG. 1 illustrates a conventional exhaust emission reduction apparatus.

10: harmful particulate matter 21: discharge electrode
23: ground electrode 24: concentrator
25: plasma generator 40: plasma generator
43: power supply 45: plasma

BEST MODE FOR CARRYING OUT THE INVENTION

Reference will now be made in detail to the exemplary embodiments of the present invention.

Figure 2:
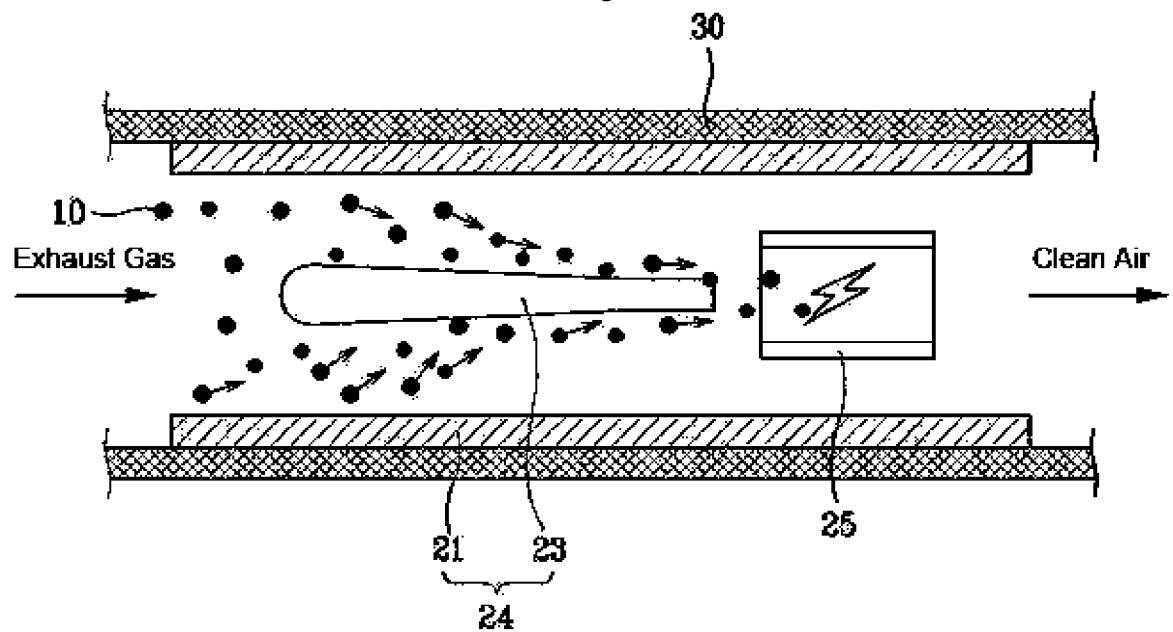
FIG. 2 is schematic sectional view illustrating an apparatus for treating exhaust particulate matter according to a first embodiment of the present invention.

FIG. 2 is schematic sectional view illustrating an apparatus for treating exhaust particulate matter according to a first embodiment of the present invention.

Referring to FIG. 2, the apparatus for treating exhaust particulate matter according to current embodiment includes a concentrator 24 concentrating harmful particulate matter 10 in one place, and a plasma generator 25 burning concentrated particulate matter.

The concentrator 24 includes a discharge electrode 21 charging the harmful particulate matter 10, and a ground electrode 23 attracting the charged harmful particulate matter, both of which are installed in the tailpipe 30 of a vehicle.

The discharge electrode 21 is formed of a cylindrical tube, and installed in close contact with an inner wall of the tailpipe 30. The ground electrode 23 is installed inside the discharge electrode 21, and particularly on a central axis of the tubular discharge electrode 21 so as to be spaced farthest from the discharge electrode 21. The ground electrode 23 has the shape of a circular rod, which tapers off toward a downstream side in an exhaust gas flow direction.

Meanwhile, voltage is applied to each of the discharge and ground electrodes 21 and 23, wherein a negative voltage is applied to the discharge electrode 21 so as to be able to charge the harmful particulate matter 10, and a positive voltage is applied to the ground electrode 23 so as to be able to attract the negatively charged harmful particulate matter 10. Alternatively, the positive voltage may be applied to the discharge electrode 21, and the negative voltage may be applied to the ground electrode 23.

The intensity of the voltage applied to each of the discharge and ground electrodes 21 and 23 is weak enough for the harmful particulate matter 10 to flow downstream while moving near the ground electrode 23 as indicated by arrows without attached to the ground electrode 23 and then to be concentrated at the rear of the ground electrode 23. Further, because the ground electrode 23 tapers off toward the downstream side, the harmful particulate matter 10 is not easily attached to the ground electrode 23 although the harmful particulate matter 10 flows downstream.

According to current embodiment, the plasma generator 25 is a device for generating high-temperature plasma, and it is not particularly limited to its type. In this plasma generator 25, a high voltage is applied to electrodes, gases passing between the electrodes are accelerated by an electric field, and the accelerated gases are ionized by collision. Thereby, plasma is generated.

The plasma generator 25 is installed near the downstream side of the ground electrode 23, and particularly, on the central axis of the tailpipe 30 such that the harmful particulate matter 10 can be easily introduced.

In this manner, the harmful particulate matter 10 accepts electrons from the discharge electrode 21, is negatively or positively charged, and concentrated at the rear of the ground electrode 23 by means of repulsive force applied by the discharge electrode 21 and attractive force applied by the ground electrode 23. The concentrated harmful particulate matter 10 flows into the plasma generator 25. The harmful particulate matter 10 introduced into the plasma generator 25 is burned up by the gas generated at a temperature of about 2,000K by plasma discharge.

The apparatus for treating exhaust particulate matter according to current embodiment may be installed at the front of the diesel particulate filter (DPF) which is generally used. Thus, the apparatus for treating exhaust particulate matter primarily reduces the harmful particulate matter, and the DPF secondarily cleans the exhaust gases. Thereby, the concentration of soot and smoke contained in the exhaust gases emitted through the tailpipe can be remarkably reduced.

Figure 3:
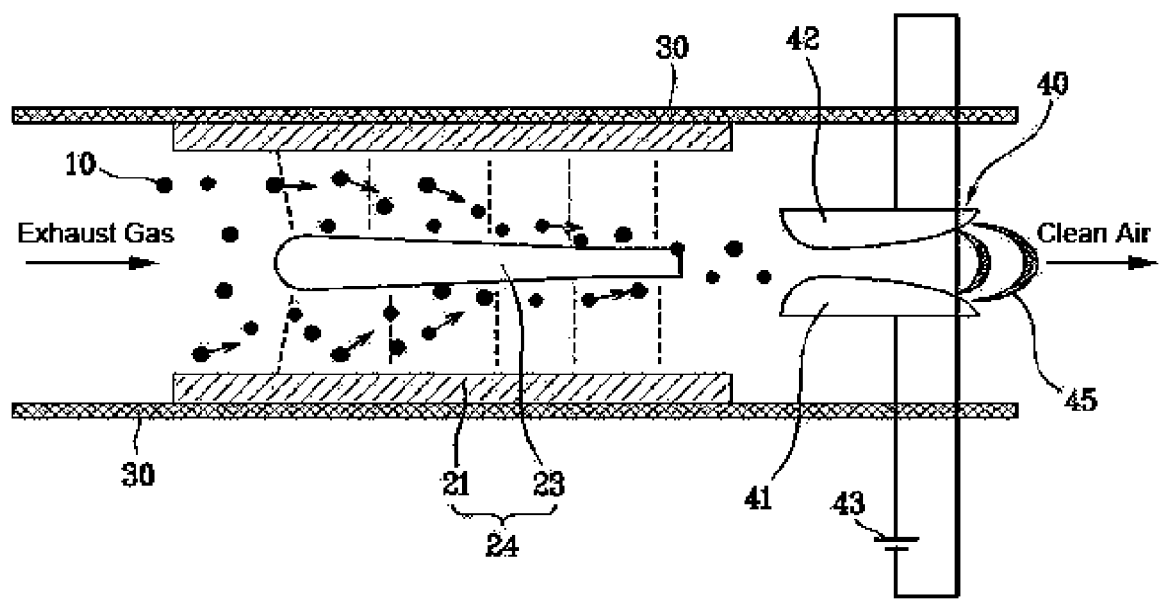
FIG. 3 is schematic sectional view illustrating an apparatus for treating exhaust particulate matter according to a second embodiment of the present invention.

FIG. 3 is schematic sectional view illustrating an apparatus for treating exhaust particulate matter according to a second embodiment of the present invention.

Referring to FIG. 3, the apparatus for treating exhaust particulate matter according to current embodiment includes a concentrator 24 concentrating harmful particulate matter 10, and a plasma generator 40 burning concentrated particulate matter.

A structure of the concentrator 24 is identical to that of the first embodiment, and the plasma generator 40 includes a gliding arc discharge plasma generator.

The plasma generator 40 includes two opposite electrodes 41 and 42, to which a direct current (DC) power supply 43 is connected. A positive voltage is applied to one 41 of the electrodes, and a negative voltage is applied to the other one 42. The power supply 43 has a high voltage of 50 kV or more such that arc can be generated between the electrodes 41 and 42.

Meanwhile, the electrodes 41 and 42 has a structure in which opposite faces are bent in an arc shape, and an interval between the electrodes 41 and 42 becomes wide as it moves from an inlet to an outlet.

Figure 4:
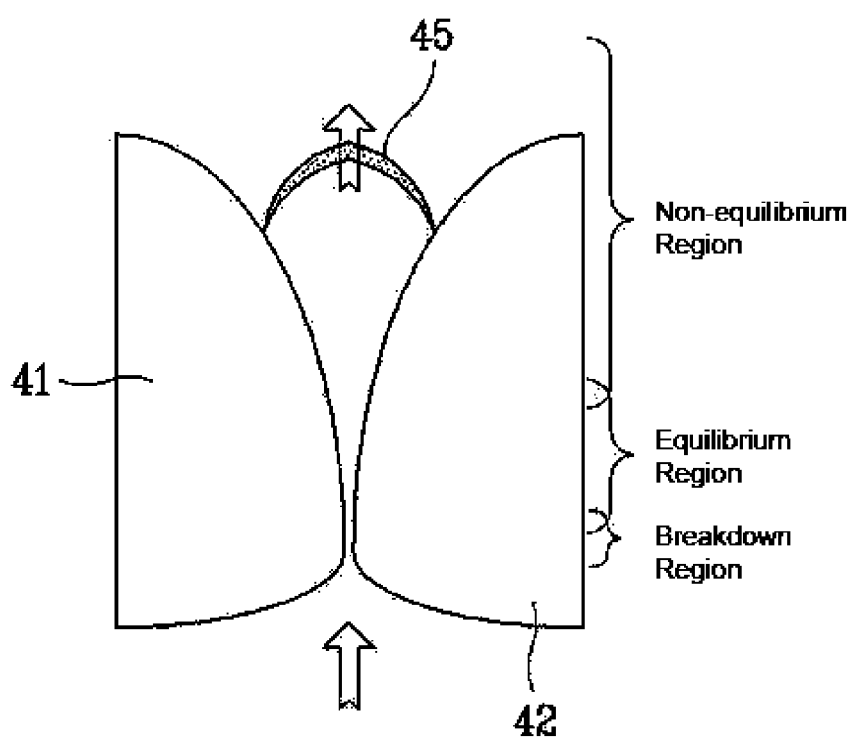
FIG. 4 schematically illustrates a plasma generator employed to an apparatus for treating exhaust particulate matter according to a second embodiment of the present invention.

As illustrated in FIG. 4, when the gases enter the narrow inlet to pass through a breakdown region, the arc is generated between the electrodes 41 and 42, and then spreads to a non-equilibrium region past an equilibrium region as if it slides along the electrodes.

Due to this arc, the gases are excited into plasma 45. At this time, the temperature of electrons amounts to 10,000K, and the temperature of the gases amounts to 2,000K. Therefore, the harmful particulate matter 10 contained in the gases is completely burned up by high-temperature plasma amounting to 2,000K.

The gliding arc discharge plasma 45 is characterized in that it is generated through the high speed of a fluid, high voltage, and low current discharge. Because the gliding arc discharge plasma 45 is thermally stable while having a characteristic of the arc, and can process a great deal of fluid, it is applied to various fields.

The invention claimed is:

1. An apparatus for treating particulate matter generated through combustion, the apparatus comprising:
    a pipe through which harmful particulate matter passes, the pipe comprising an inlet and an outlet;
    a concentrator comprising:
        a discharge electrode installed on an inner surface of the pipe; and
        a core installed inside the discharge electrode along a central axis of the discharge electrode, the core having a first end positioned towards the inlet of the pipe and a second end positioned towards the outlet of the pipe opposite the first end, wherein the discharge electrode is operable to charge the harmful particular matter and the core is operable to attract the charged harmful particulate matter toward the core, thereby concentrating the harmful particulate matter; and
    a plasma generator installed in the pipe at the second end of the core along the central axis of the discharge electrode and generating plasma to burn the concentrated particulate matter exhausted from the concentrator, the plasma generator including
        two electrodes arranged along a central longitudinal axis of the pipe and having respective opposing faces being in an arc shape.

2. The apparatus according to claim 1, wherein the core of the concentrator tapers off toward the second end.

* * * * *